(No Model.)
C. H. MATTHIESSEN.
Road Scrapers.
No. 230,307. Patented July 20, 1880.
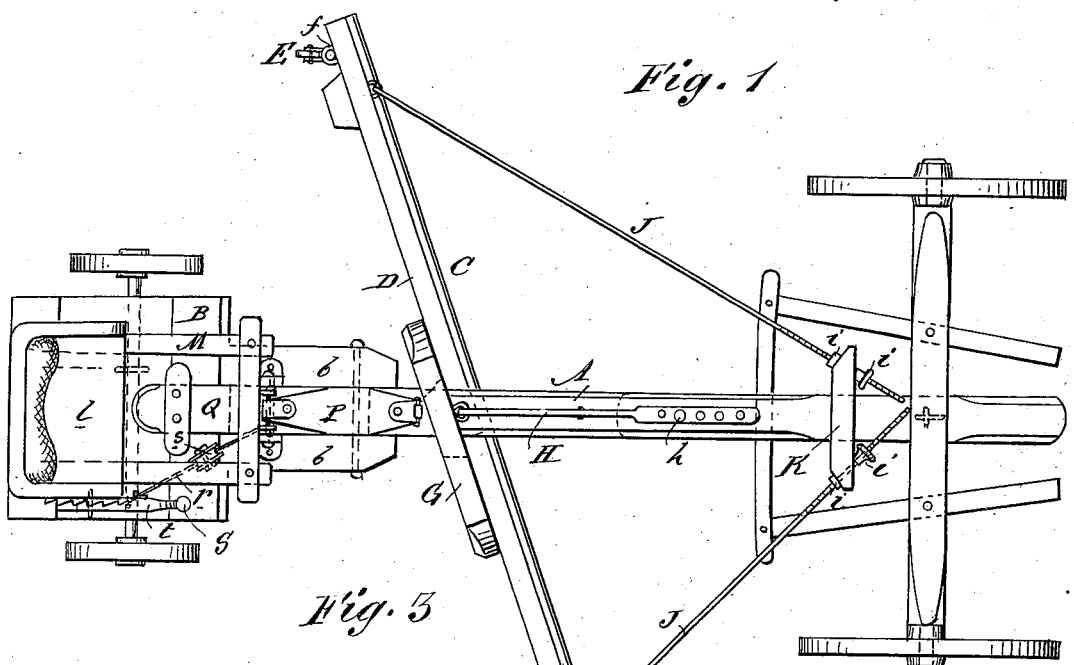
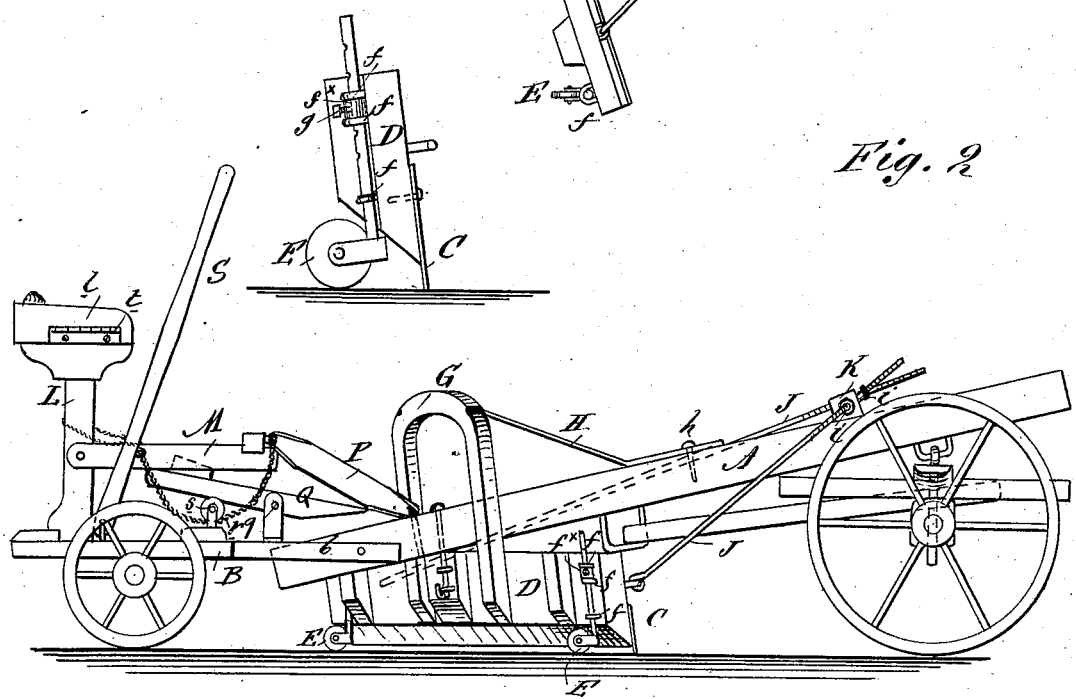
WITNESSES:
C. Neveux
E. Sedgwick
INVENTOR:
C. H. Matthiessen
BY Munn & Co
ATTORNEYS.

UNITED STATES PATENT OFFICE.

CONRAD H. MATTHIESSEN, OF ODELL, ILLINOIS.

ROAD-SCRAPER.

SPECIFICATION forming part of Letters Patent No. 230,307, dated July 20, 1880.

Application filed March 13, 1880. (No model.)

*To all whom it may concern:*

Be it known that I, CONRAD H. MATTHIESSEN, of Odell, in the county of Livingston and State of Illinois, have invented a new and useful Improvement in Road-Scrapers, of which the following is a specification.

This invention relates to a machine which may be used for scraping and planing roads, and for ditching and other similar purposes.
The invention consists in certain novel details of construction, arrangement, and combination of devices for raising and lowering the blade, and for adjusting it to different positions, as hereinafter more particularly described.

In the accompanying drawings, Figure 1 is a top view of an apparatus embodying my improvement. Fig. 2 is a side view of the same. Fig. 3 is an end view of the blade and its stock.
Similar letters of reference indicate corresponding parts.

The working parts of the apparatus are supported by a four-wheeled carriage, which may be drawn by one or more horses. Bolsters are dispensed with, and instead thereof the reach A rests upon the hounds, and is connected with the front axle-tree by a staple and eyebolt, somewhat after the manner sometimes adopted in wagons for hauling lumber. The rear end of the reach is connected by a horizontal bolt with a crotch, $b$, on the front end of a platform, B, carried by the rear axle-tree, so as to allow of a vertical oscillation of both the reach and the platform.
The scraper consists of a blade, C, bolted to the lower edge of a wooden bar or stock, D, provided with a caster-wheel, E, at each end. The shank of each caster-wheel passes through eyes F, secured to the stock D, and the wheels may be adjusted higher or lower and held in position by means of a set-screw, $g$, working in a collar, $F^x$, between two of the eyes F, and engaging with notches in the shank.

To the stock D is attached, by its ends, a cast-iron bar, G, of approximate horseshoe form, which not only adds weight to the scraper, but also serves as a means for connecting and adjusting it, as hereinafter described. The stock D is suspended midway of its length, from the reach A, by means of a staple and eyebolt, and the reach passes between the horseshoe-shaped bar G and the top of the stock.

H represents an iron rod, the rear end of which is connected by an eye and staple to the upper part of the bar G, and its front end is attached to the reach A by a bolt or screw, $h$, passing through holes in said front end and said reach. By moving the rod H forward or rearward and placing the bolt $h$ in different holes the scraper may be adjusted to either a vertical or an inclined position, so as to scrape or to shave or plane the road, or to dig as a ditcher.

J J represent two rods, which have their rear ends connected by eye-and-staple joints to the stock D, near the ends thereof, and their front ends passing through a rigid bar, K, on the reach A, with nuts $i\ i$ on either side of said bar. By adjusting the nuts $i\ i$ so as to move the rods J J farther forward or farther backward, and thereby change the relative positions of the ends of the stock D, the scraper may be adjusted at a greater or less angle of inclination with relation to the line of travel of the apparatus, so as to throw the dirt more or less to the side of the road.

From the platform B rise two standards, L, on the top of which is a seat, $l$, for the driver. To the standards L is connected the rear end of a frame, M. To the front end of this frame is jointed the upper and rear end of a link or connecting-bar, P, the lower and front end of which is jointed to the reach A, just in rear of the stock D. A foot-lever, Q, has its fulcrum at $q$, on the platform B, and its short arm bears against the under side of the link or bar P. A cord or chain, $r$, has one end connected to the front end of the frame M, and the other end passed through a pulley, $s$, and attached to a hand-lever, S, pivoted at its lower end to the platform B, and adapted to engage with a rack or notched bar, $t$, at the end of the driver's seat. When the driver braces his feet against the front of the frame M and leans backward the scraper is raised by the action of the crotch $b$ on the reach A. When he removes his feet from the frame M and presses down on the long arm of the foot-lever Q the short arm of said lever bears against the link or bar P, while its fulcrum presses down on the platform B, and the effect of this action is to press the scraper harder against the ground. By pulling backward on the hand-lever S, and engaging it with the rack t, the scraper is raised and held at the desired position, and then by pressing on the foot-lever at the same time an even and uniform pressure is imparted to the scraper.

Having thus fully described my invention, I claim as new and desire to secure by Letters Patent—

1. The combination, with the reach A and stock D, of the rods J, nuts i, and rigid bar K, as shown and described, for the purpose specified.

2. The combination of the reach A, link or bar P, frame M, seat l, standards L, and platform B, as shown and described, for the purpose specified.

3. The combination of the foot-lever Q and link or bar P with the platform B, reach A, frame M, standards L, and seat l, as shown and described, for the purpose specified.

4. The combination of the cord or chain r, pulley s, hand-lever S, and rack t with the frame M, platform B, and seat l, as shown and described, for the purpose specified.

CONRAD H. MATTHIESSEN.

Witnesses:
M. E. WRIGHT,
W. B. BUCHANAN.